United States Patent [19]

Schindel

[11] Patent Number: 4,593,576
[45] Date of Patent: Jun. 10, 1986

[54] MICRO STEPPING DRIVE

[75] Inventor: Arnold Schindel, Fairlawn, N.J.

[73] Assignee: The Singer Company, Little Falls, N.J.

[21] Appl. No.: 581,940

[22] Filed: Feb. 21, 1984

[51] Int. Cl.[4] .................. F16H 1/18; F16H 1/20; F16H 27/02
[52] U.S. Cl. .................. 74/424.8 B; 74/424.8 R; 74/89.15
[58] Field of Search .......... 74/424.8 B, 424.8 R, 74/89.15, 99 A; 360/106, 107

[56] References Cited

U.S. PATENT DOCUMENTS

| 3,121,345 | 2/1964 | Zeigler et al. | 74/499 |
| 3,606,801 | 9/1971 | Williams | 74/424.8 R |
| 3,731,546 | 5/1973 | MacDonald | 74/63 |
| 3,807,243 | 4/1974 | Yada | 74/63 |
| 3,872,738 | 3/1975 | Price et al. | 74/424.8 B |
| 4,024,890 | 5/1977 | Yasuoka | 74/424.8 B |

FOREIGN PATENT DOCUMENTS

| 0060085 | 2/1913 | Fed. Rep. of Germany | 74/424.8 B |
| 1328909 | 4/1963 | France | 74/424.8 B |
| 354006 | 8/1931 | United Kingdom | 74/424.8 B |
| 0700727 | 12/1979 | U.S.S.R. | 74/99 A |

Primary Examiner—Lawrence J. Staab
Assistant Examiner—M. Bednarek
Attorney, Agent, or Firm—Thomas W. Kennedy

[57] ABSTRACT

An internally and externally threaded double nut is screwed onto the threaded shaft of a stepper motor. The nut is restrained from rotational motion thereby limiting it to translation along the shaft axis. An internally threaded output sleeve is screwed onto the external thread of the double threaded nut. The pitch of the nut internal thread is smaller than that of the external thread so that rotary motion reduction occurs at the output sleeve. A ball bearing is positioned in contacting support between the sleeve and the shaft thereby minimizing output sleeve tolerance accumulations of eccentricity and axial positioning.

2 Claims, 1 Drawing Figure

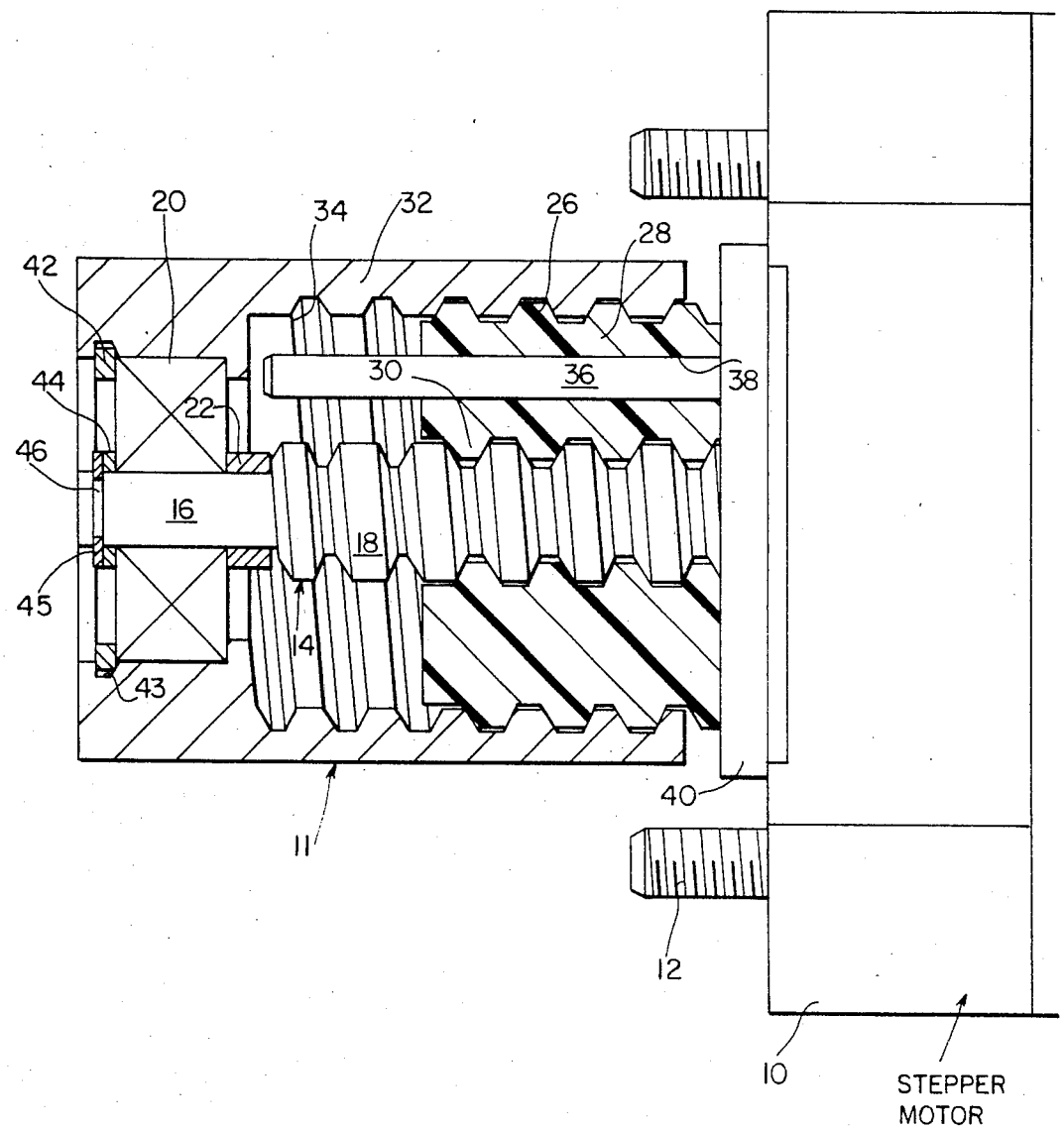

MICRO STEPPING DRIVE

BRIEF DESCRIPTION OF THE PRIOR ART

Disc drives (both floppy and hard disc) for computer RAM memory constitute a major element of office automation systems. Most of the available smaller drives below 25 m bytes and certain larger drives utilize stepper motors driving lead screws or capstan belts to achieve proper track positioning for read/write operations on the disc.

With increasing market pressure for more information density on each disc and consequently more bytes per disc, the requirements for head positioning have become more exacting and require better accuracy and smaller incremental movement per step of a driving motor. The incremental angles which were originally 15°/step have gradually been reduced to 0.9° for current dense disc drives driven by stepping motors. Contemporary technology of toothed laminations and hybrid rotor elements appear to stagnate at this level due to geometry limitations since larger motor diameters are generally excluded.

BRIEF DESCRIPTION OF THE PRESENT INVENTION

The disclosed invention relates to a mechanical lead screw ratio changer which allows stepping motor operation in increments below those of the prior art and quite possibly as low as 0.3° without being subjected to the limitations of electromagnetic geometry.

The basic construction of the present invention utilizes the principle of using two screwed threads of different pitch as a rotary motion reduction device.

Rotary motion reduction devices utilizing two screwed threads of different pitch have been developed in the prior art. Examples of this are U.S. Pat. Nos. 4,024,890 to Yasuoka; 3,731,546 to MacDonald; 3,606,801 to Williams; and 3,121,345 to Zeigler, et al.

Unlike the structure of these patents, the present invention is designed for the more exacting application of high accuracy and low hysteresis of angular displacement. In order to accomplish this, the present invention includes an output member which is supported directly on the input member thus minimizing tolerance buildup, notably related to eccentricity and axial position.

BRIEF DESCRIPTION OF THE FIGURE

The above-mentioned objects and advantages of the present invention will be more clearly understood when considered in conjunction with the accompanying drawing, in which:

The FIGURE is a cross-sectional view illustrating the internal members of the present micro stepping drive.

DETAILED DESCRIPTION OF THE INVENTION

A conventional stepper motor provides the input power for the present micro stepping drive, generally indicated by reference numeral 11. The motor housing 10 has a number of threaded studs 12 for allowing external mounting of the motor housing 10. The motor shaft generally indicated by reference numeral 14 includes a threaded section 18 characterized as a conventional acme lead screw. The outward end 16 of the shaft is generally cylindrical. Ball bearing 20 is supportive of this cylindrical end and is coaxial therewith.

An annular spacer 22 is positioned along the cylindrical end 16 and is in coaxial relationship therewith. The spacer 22 is interposed between confronting surfaces of the ball bearing 20 and an adjacent thread of the threaded shaft section 18.

A double threaded nut 26, preferably fabricated from plastic, is engaged with the threaded section 18. The double threaded nut 26 includes an outward thread 28 and an inner thread 30, threads 28 and 30 being of different pitch. The pin 36 extends in parallel axial relationship with shaft 14, the pin being cantilevered at a first end to a shoulder 40 of the motor housing 10. A bore 38 in spaced parallel relationship to shaft 14 receives the pin and constrains the motion of double threaded nut 26 in an axial direction only.

A threaded sleeve 32 engages thread 28 of the double threaded nut 26. Sleeve 32 includes an internal thread 34 to achieve differential motion, relative to shaft 14, due to the unequal pitch of thread 28 and thread 30.

In order to secure ball bearing 20 in place, a ring 42 is set within an annular groove 43 formed in sleeve 32. A spacer 44 is positioned along the cylindrical end 16 of shaft 14 and, like ring 42, bears against the left side of bearing 20. In order to retain spacer 44 in position, snap ring 45 is engaged within shaft groove 46 thereby retaining snap ring 45 in contact with spacer 44.

When assembling drive 11, double threaded nut 26 must be engaged with the shaft threaded section 18 by turning the shaft while positioning pin 36 within bore 38. Sleeve 32 is in turn threaded on the double threaded nut 26. Spacer 22, ball bearing 20 and spacer 44 are slipped onto the shaft end 16. Finally, ring 42 is positioned within its mating groove 43 while the securement of snap ring 45 in its mating shaft groove 46 completes the assembly.

In operation, sequential electrical pulsing of the stepper motor causes shaft 14 to turn in a direction based upon the sequencing of motor winding energization. The rotation causes double threaded nut 26 to translate due to the anti-rotation effect of pin 36. The axial motion of the double threaded nut 26 in turn causes rotation of threaded output sleeve 32 which then drives a read/write head by an interconnected endless steel belt (capstan) in a manner clear to one of ordinary skill in the art and excluded from the FIGURE in order to simplify it.

Depending on the differences of pitch and the hand of the threads 28 and 30 of the double threaded nut 26, varying direction and/or increments of motion may be realized.

For example, if inner thread 30 is actually a two-threaded multistart, and the incremental motion is 1°, double threaded nut 26 may typically advance 1/360×0.500 which approximately equals "0.001" (to the left). This motion translated to outward thread 28 (of same hand), taken as four threads per inch, results in a rotational motion of 0.5°, thus achieving a 50 percent reduction in incremental angle. By suitable selection of relative screw pitches, a wide range of reduction can be achieved. The limitations being avoidance of helix angles below those whose tangent is less than the coefficient of friction, and in the opposite vein, maintenance of at least one continuous pitch lead (one full screw thread). Threads on these devices are generally multistart to average out subtle geometric differences.

In order to minimize friction and hysteresis effects, double threaded nut 26 is preferably made of reinforced Teflon or some similar thermoplastic which exhibits low friction and wear against the stainless steel or hardened screw surfaces. The screws need not be coaxial, but linearly arranged.

It should be understood that the invention is not limited to the exact details of construction shown and described herein for obvious modifications will occur to persons skilled in the art.

I claim:

1. A micro stepping device for reducing rotary motion comprising:

a stepper motor having a drive shaft with an axis and with a threaded section and with an outward end, said outward end having a bearing surface;

a double threaded nut engaged by said shaft and having internal and external threads of different pitch, the internal threads of the nut being screwed on the threaded shaft, the pitch of said internal threads being less than the pitch of said external threads;

a cylindrical threaded output member having internal threads screwed to the external threads of the nut for rotary movement about said axis;

means restricting the nut to translation along the shaft in an axial direction; and a ball bearing mounted on said bearing surface and interposed directly between the cylindrical threaded output member and the shaft for minimizing tolerance accumulations therebetween, due to eccentricity and axial positioning, wherein said drive shaft is supported by and actuated by said motor and said nut is supported by and actuated by said drive shaft and said output member is supported by said ball bearing and actuated by said nut.

2. The device set forth in claim 1 wherein the restricting means comprises a pin cantilevered at one end to a housing of the motor and received within a bore in the nut, and wherein said pin is supported by said motor and is arranged to slidably engage said nut and to resist a torsional load from said nut about said axis and to permit axial movement of said nut relative thereto, and wherein said drive shaft and said output member are composed of a steel material and said nut is composed of a thermoplastic material for minimizing frictional forces between said contacting threads of said drive shaft and nut and said contacting threads of said nut and sleeve and for minimizing the torsional load on said pin.

* * * * *